(12) United States Patent
Mezzapelle

(10) Patent No.: US 11,678,010 B1
(45) Date of Patent: Jun. 13, 2023

(54) METHOD OF IMPROVING AUDIO FOR A PUBLISHED VIDEO

(71) Applicant: Joseph Mezzapelle, Poughquag, NY (US)

(72) Inventor: Joseph Mezzapelle, Poughquag, NY (US)

( * ) Notice: Subject to any disclaimer, the term of this patent is extended or adjusted under 35 U.S.C. 154(b) by 0 days.

(21) Appl. No.: 17/460,165

(22) Filed: Aug. 28, 2021

(51) Int. Cl.
*H04N 21/439* (2011.01)
*H04N 21/43* (2011.01)
*H04N 21/482* (2011.01)
*H04N 21/858* (2011.01)
*H04N 21/8547* (2011.01)

(52) U.S. Cl.
CPC ..... *H04N 21/4398* (2013.01); *H04N 21/4302* (2013.01); *H04N 21/4394* (2013.01); *H04N 21/4396* (2013.01); *H04N 21/482* (2013.01); *H04N 21/8547* (2013.01); *H04N 21/8586* (2013.01)

(58) Field of Classification Search
CPC ........... H04N 21/4398; H04N 21/4302; H04N 21/4394; H04N 21/4396; H04N 21/482; H04N 21/8547; H04N 21/8586
See application file for complete search history.

(56) References Cited

U.S. PATENT DOCUMENTS

| 10,255,898 B1* | 4/2019 | Movshovitz-Attias ...................... G11B 27/034 |
| 2012/0258798 A1* | 10/2012 | Cullen .................... A63F 13/63 463/36 |
| 2015/0221339 A1* | 8/2015 | Snibbe ................. H04N 21/854 386/285 |
| 2015/0279424 A1* | 10/2015 | Marck .................. G11B 27/036 386/285 |

* cited by examiner

*Primary Examiner* — Adil Ocak

(57) ABSTRACT

A holistic solution for improving the quality of publicly available/published video by providing an improved audio. The owner of the published video or audio content within the published video can upload the improved audio to a network database where it is associated with a video feature in common with the publicly available video. The client consuming the video, can activate a novel application/module/browser extension on a client terminal to detect the video feature of a currently selected video to begin downloading the improved audio. After a significant portion of the audio has been downloaded the invention mutes the audio playback of the video on the client terminal at or about the same time as it begins playback of the audio content so as to minimize distortion from the transition between the original audio and the improved audio. Additional features including audio/video synchronization, selectable audio tracks, visual feedback, and monetization are disclosed.

16 Claims, 5 Drawing Sheets

FIG. 1 - Inventive Architecture

FIG. 2 - Inventive Server Side System

FIG. 3 - Client terminal device with inventive functions for improving the audio of a selected video content FIG. 4 - Advertising server system Example of YouTube settings - See bottom portion of Playback / Quality options, but no audio options.

METHOD OF IMPROVING AUDIO FOR A PUBLISHED VIDEO

FIELD OF THE INVENTION

The present invention is related in general to an audio improvement for network based systems that provide on demand video.

BACKGROUND OF THE INVENTION

Video access platforms (for example YOUTUBE, TIK TOK, TWITCH) have become the primary means of media consumption for millions of Americans. In addition to providing a robust outlet for network television, musicians and Hollywood personalities, these video platforms allow emerging artists to publish their content for millions of consumers and have a chance to be 'discovered', ie. to gain a following of subscribers and monetize the content. Currently, many video access platforms place an importance, and a monetary value on the number of 'views' or 'amount of time watched' for a particular video. The number of 'views' a video has often determines how valuable it is.

There are several problems with the existing video access platforms including the following:

Primarily the video access platforms are centered around the video content itself as opposed to the audio content that is part of the video. Most of the interfaces in video access platforms provide little to no audio customization or audio information to the end user when consuming the content. Everything is optimized for the video. See FIG. 5. (prior art).

The video access platforms have complete control over the characteristics and processing applied to the original audio included with an uploaded video. While they optimize the video playback for a given network bandwidth, it is often the audio that will get filtered or reduced or compressed in some way in order to save bandwidth or server resources. Thus a video with original audio that sounds good currently, may no longer sound good when a video platform changes its audio processing or audio streaming properties at a later date. Note the attached article: https://www.yoursoundmatters.com/stop-listening-to-music-on-youtube/

Once a new video has been uploaded/posted/published to the video access platform, the creator of the video is not able to update or replace the video or audio without losing the address of the video in addition to any 'views' accrued for said video. As technology improves, and video platform audio processing changes, there are improvements in both network bandwidth and in audio and video reproduction capabilities. However, the creator cannot produce an updated video or associated audio without losing all of the 'views' and 'time watched' (and comments and 'likes') for the originally posted video.

Further, it is not desirable to intentionally split apart communities over technology features. Where providing a new video platform with improved audio could solve some of the aforementioned problems, it would, by its nature, divide users away from the existing video platforms and split communities apart. At the same time, when video streaming platforms focus too much on video and social features to the detriment of audio, the overall quality of the platform and the content decreases. There should be a holistic solution to the above mentioned problems that does not require splitting apart an established community with a new video platform.

BRIEF SUMMARY

The invention allows a user/content creator/publisher to upload a video to a video access platform (such as YOUTUBE) and obtain an identifying information (a URL or other easily accessible information) for their published video. The user can then upload an improved audio file to a database that associates the identifying information with the improved audio. The improved audio can be uploaded as often as needed, by the user in order to provide improved audio given the ever changing landscape of audio mixing, network encoding, audio rendering. Thus the content creator has the opportunity to provide improved and alternative soundtracks for an already published video.

On the client/consumer side, the inventive application detects identifying information (a URL or other easily accessible information) for a published or posted or uploaded video selected by the user on an application, webpage, and/or browser extension of the video access platform in order to download (or partially download) an improved audio for the published video to the user's client terminal. When an acceptable portion of the improved audio file has been downloaded, the invention will mute the audio provided by the video access platform and begin to play the improved audio synchronized with the published video. Where the improved audio and published video are both started at the same time, or the improved audio will take over from the original audio at whatever point in time the published video is currently playing at so as to stay synchronized with the video.

Additional features are described including options for content creators or publishers to monetize access to improved audio or very high bandwidth audio formats such as 7.1 surround sound, and also for content creators or publishers to provide alternative audio to a published video. This would open many possibilities for creators and publishers to provide improved audio experiences for end users across many video access platforms. These features will also provide further incentives for viewers to 'rewatch' an existing video, such as to hear an improved audio, or possibly a temporary or time sensitive audio that is only there for a short time. Thus this invention offers a holistic solution to known problems with video access platforms, in addition to providing increased customization and functionality for providing improved audio with a published video while allowing the published video to maintain its valuable lifetime statistics including views, likes, and hours/days watched. In addition this will allow the video access platform to focus on, and continue to optimize the video experience, while the inventive platform will ensure the ability to maintain the audio quality for the video over time.

DETAILED DESCRIPTION OF THE INVENTION

Figure 1:
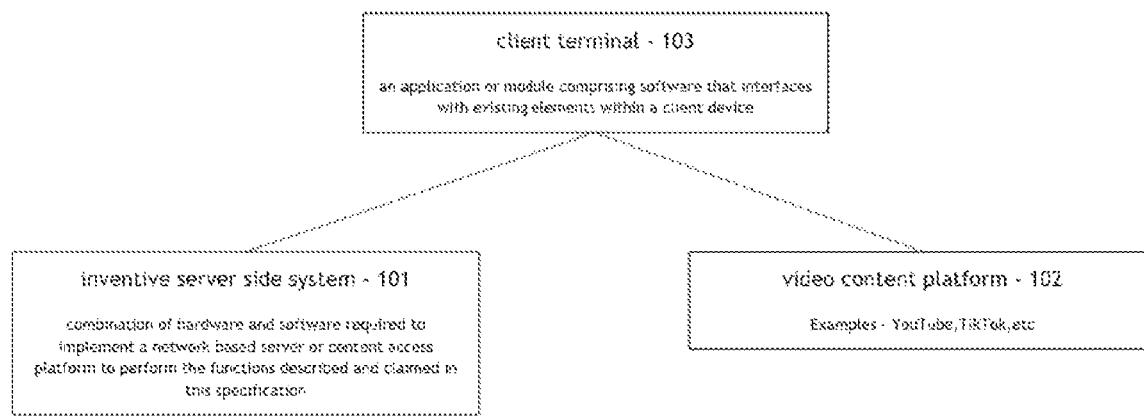
FIG. 1 illustrates the signalling between the inventive server side system embodied in a server and a client terminal allowing a user to augment improved audio to a selected published video from a video access platform.

The inventive architecture of FIG. 1 can be embodied as part of a server or part of a content platform to access video content (such as YOUTUBE, TWITCH, NETFLIX, SPOTIFY, or a cable television provider) such that it is positioned to provide on demand improved audio content to a user of a client side terminal.

The user of client terminal 103 has a network connection to a video content platform 102 and another network connection to the inventive server side system 101. When the user of the client terminal selects a published video from the video content platform for playback, an inventive module or application within the client terminal contacts the inventive server side system to identify the selected published video. The server side system allows the client terminal to stream or download improved audio content based on the selected published video. The client terminal can then synchronize playback of the improved audio with the selected published video.

The inventive server side system in FIG. 1 is a combination of hardware and software required to implement a network based server or content access platform to perform the functions described and claimed in this specification. The inventive server side system 101 can be embodied as a server or as a module in a server or a combination of network components. The client side terminal 103 comprises an application or module comprising software that interfaces with existing elements within a client terminal including the well known audio, video and user interfaces provided on modern client terminals such as smartphones, cellphones, laptops, tablets, personal computers, televisions, smart speakers, smart watches, smart glasses, virtual reality and augmented reality devices. The bidirectional network connections between elements 101 and 103, and between elements 102 and 103 can be any well known type of network including wired (coaxial, cable tv, internet etc.) and wireless (bluetooth, satellite, internet etc.) or any combination of known network interfaces that allow for bidirectional signaling and content delivery to the client terminal. Improved audio includes the best possible audio able to be downloaded by the client terminal, including, but not limited to MP3, WAV, AIFF, AAC, VORBIS, PCM as well as lossless formats including but not limited to FLAC and ALAC.

Figure 2:
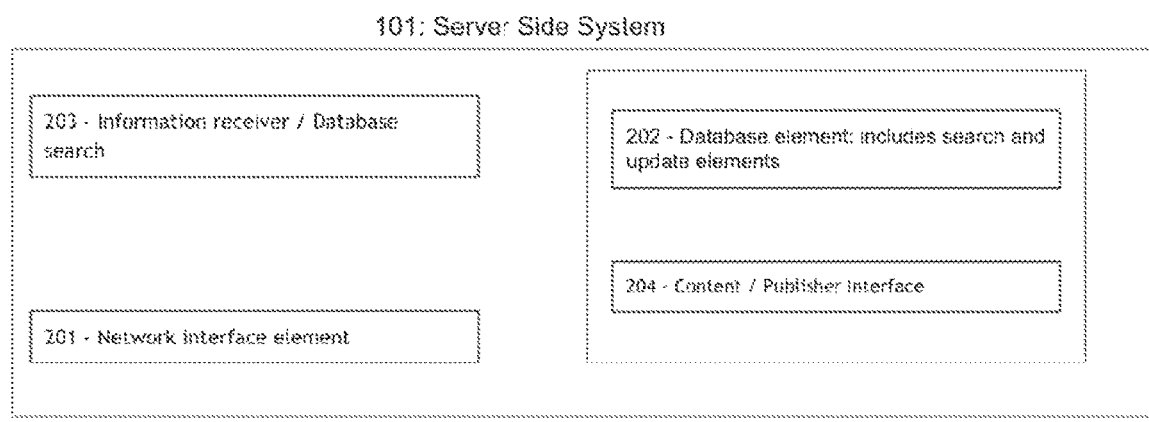
FIG. 2 illustrates the inventive server side system embodied within a server.

FIG. 2 illustrates the inventive server side system embodied as a server or as part of a content access platform. The server side system comprises software, hardware, or a combination of such in order to implement a set of logical functions or elements. Element 201 is a network interface to send and receive data between the inventive server side system and the client terminal over a network connection. Database element 202 stores information identifying improved audio content correlated to information identifying a selected video content. For example, the information identifying a selected video content can comprise a URL. The information identifying improved audio content can be a reference to the stored improved audio or can be the improved audio itself. In addition the database element 202 may further store authentication information correlated with the information identifying a selected video content where the authentication information identifies the owner or publisher of the published video on the video content platform. Search element 203 receives the information identifying a selected video content and searches the database element in order to allow the client terminal to stream or download the improved audio content for the selected video content. Update element 204 provides an interface for a content creator or publisher to append or update audio content correlated to a given published video within the database element 202. Update element 204 may optionally perform an authentication using the stored authentication information compared to received personal information from the content creator or publisher. The content creator or publisher can use any well known client terminal to access, via a network connection, the inventive server side system in order to update or append improved audio content to be used in or referenced in the database element 202. The server side system can optionally convert the updated improved audio content to an appropriate improved audio format as needed to facilitate the future download of the improved audio content to the client terminals.

Figure 3:
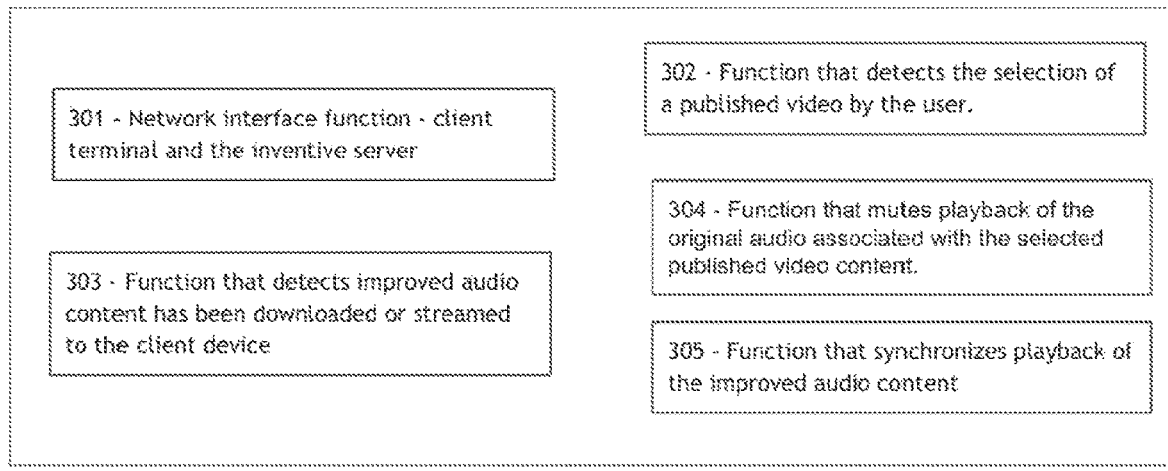
FIG. 3 illustrates the inventive components within the client terminal.

FIG. 3 illustrates a client terminal with inventive functions for improving the audio of a selected video content. The stages are primarily implemented in software, such as part of an application or module, to enable the functions recited in the specification and claims to be performed by a client terminal as described throughout the specification and claims. The functions may further be implemented in a combination of hardware and software to integrate with existing client terminals. Network interface function 301 sends and receives data between the client terminal and the inventive server side system over a network connection. Function 302 detects the selection of a published video by the user. The selection of the published video can be detected by detecting a particular input from the user interface of the client terminal, or from a parameter detected at the client terminal such as a selected URL associated with the selected published video. Function 302, upon detecting the selected published video, enables the network interface function 301 to transmit information identifying the selected video content to the inventive server side system. In addition, function 302 can optionally detect additional input from the user to allow the user to select one from a plurality of different audio contents each associated with the selected published video. Where the selected one from a plurality of different audio contents is indicated to the inventive server side system. Once the inventive server side system has begun transmitting the improved audio content back to the client terminal, function 303 detects when a sufficient amount of the improved audio content has been downloaded or streamed to the client terminal to begin reliable playback, and then further detects a video timestamp parameter that indicates the current playback of the selected published video content. The video timestamp parameter could be 0 or null to indicate that the selected published video has not yet begun playback, or could indicate at what point in time the selected published video is currently playing. Function 304 mutes playback of the original audio associated with the selected published video content and function 305 synchronizes playback of the improved audio content with the playback of the selected published video content using an audio timestamp parameter derived from the video timestamp parameter determined by function 303. Functions 304 and 305 can occur substantially simultaneously so as to provide as smooth a transition as possible between the original audio content to the improved audio content.

Figure 4:
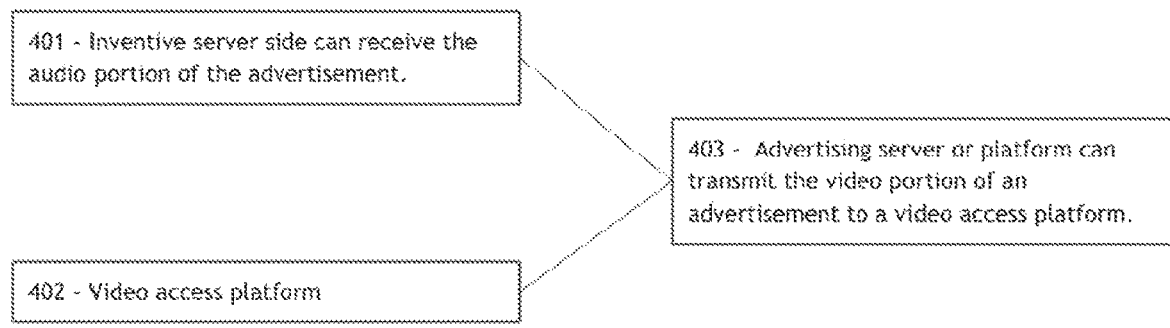
FIG. 4 illustrates an embodiment of the present invention which integrates an existing advertising server.
Figure 5:
FIG. 5 illustrates prior art video platforms.

FIG. 4 illustrates an embodiment using an advertising server where the advertising server or platform 403 can transmit the video portion of an advertisement to a video access platform 402, and also transmit the audio portion of the advertisement to the inventive server side system 401. Additional timing information can be provided by the advertising server or respectively gleaned from the received audio and video portions in order to synchronize playback of the timing of the audio portion and video portion of an advertisement. Alternatively the aforementioned audio or video timestamp parameters can be used to determine the correct playback time of an audio or video portion of an advertisement relative to a time of the current audio or video playback for a selected published video. As such advertisers can also benefit from the improved audio provided by the inventive platform.

In addition the inventive systems shown in FIGS. 1-4 can offer an improved user experience by offering different audio qualities or audio formats to be selected by the user for a particular video. For example a user can select a stereo, headphone, or surround sound format of a particular improved audio. Where certain ones of the audio formats could be monetized. For example, the surround sound format could be available for purchase through the inventive server side system. Additional features are contemplated including time sensitive versions of the audio content being made available (for example, a holiday or seasonal version of a song). Furthermore the application on the client terminal can provide additional visual feedback to the user about the status of the improved audio. For example, an indication can appear on the display of the terminal to alert the user that the improved audio has begun playback. Further indications could be included such as an indication of the dynamic range, or frequency or amplitude response of the audio or of particular frequencies or frequency bands of the audio.

Additional embodiments include the inventive server side system being part of the video access platform such that a video access platform can benefit from improved audio that can be dynamically applied to a published video without losing the lifetime statistics (views, hours watched, etc) for that particular published video. Additionally this inventive architecture is applicable to known media access platforms where the inventive server side system provides the instructions to a particular platform to deliver improved audio to a particular client terminal. Additionally, the server side system can be embodied as a plurality of separate devices performing various combinations of the recited functions.

In addition to the logic flows and network elements depicted in the figures, other intermediate steps or functions or elements may be provided within the described systems, and other steps or elements may be added to, or removed from, the described systems. Accordingly, other embodiments are within the scope of the following claims.

The invention claimed is:

1. A method performed by a client terminal for providing improved quality audio playback, the method comprising:
   detecting a user selection indicating a published video with associated original audio content to immediately stream or download to the client terminal for playback;
   where the published video is accessed by the client terminal on a network via a URL;
   in response to detecting a user selection, detecting said URL at the client terminal and transmitting the URL to a server side system;
   where the server side system is not located at the network location specified by the URL and does not store or access the published video on the network;
   receiving response information from the server side system comprising at least one improved audio content based on the URL received by the server side system;
   where the improved audio content is the audio content intended by the publisher of the published video as an alternative to the original audio content provided with the published video;
   where the response information is determined by using at least a portion of the URL received by the server side system as a pointer in a database or table within the server side system to locate the at least one improved audio content;
   detecting a user confirmation by the user of the client terminal or detecting a playable portion of the improved audio content having been received by the client terminal;
   in response to detecting either of the user confirmation or the playable portion of the improved audio content having been received, synchronizing the improved audio content to playback of the published video selected by the user.

2. The method of claim 1, such that when the published video is playing, muting the playback of the original audio content at the same time as beginning playback of the improved audio content.

3. The method of claim 2, where the improved audio content is in a format that allows for at least one of: increased frequency response, increased amplitude and increased dynamic range compared to the original audio content.

4. The method of claim 1, where the synchronizing step includes:
   detecting a video timestamp parameter that indicates the current time of playback of the selected published video;
      where the current time of playback of the selected published video is detected at the client terminal;
      setting an audio timestamp parameter that corresponds to the video timestamp parameter;
      after setting the audio timestamp parameter, beginning playback of the improved audio content based on the timing of a function that mutes the playback of the original audio content associated with the selected published video content.

5. The method of claim 1, where the client terminal can perform an analysis of the improved audio content received from the server side system to determine an audio characteristic of the audio content, and provide an indication of the audio characteristic to the user during playback of the improved audio content.

6. The method of claim 5, where the audio characteristic includes one or more of: dynamic range, or frequency or amplitude response of the improved audio content or of particular frequencies or frequency bands of the improved audio content.

7. A server side system comprising:
   a database comprising information identifying improved audio content correlated to a URL associated with a published video selectable for download or streaming by a user via a client terminal;
   where said URL is detected at the client terminal;
   where the URL is received over a network from the client terminal a short time after the user selects the published video via the client terminal;
   where the improved audio content is the audio content intended by the publisher of the published video as an alternative to original audio content provided with the published video;
   where the improved audio content is accessed by using at least a portion of the URL received by the server side system as a pointer in a database or table within the server side system;
   where the server side system is not located or partially located at the network location specified by the URL and the server side system does not host or store or provide access to the published video;
   an update interface to allow a content producer or publisher of the published video to update the improved audio content over a network;

a search component to receive the URL associated with the selected published video.

8. The device of claim 7, comprises a download interface to allow the client terminal to download or stream the improved audio content when the search component identifies the improved audio content associated with the received URL.

9. The device of claim 7, where the content producer is the creator of the video content.

10. The device of claim 7, where the content producer is the owner or publisher of the original audio included in the selected video content.

11. A client terminal able to synchronize an improved audio content to a selected published video comprising a processor that performs the following functions:
    detecting a user selection indicating a published video with associated original audio content to immediately stream or download to the client terminal;
    where the selected published video is accessed over a network via a URL;
    after detecting the user selection, detecting said URL at the client terminal and transmitting the URL to an improved audio server;
    where the improved audio server comprises improved audio content that is the audio content intended by the publisher of the published video as an alternative to the original audio content provided with the published video;
    where the improved audio content is accessed by using at least a portion of the URL received by the improved audio server as a pointer in a database or table that resides within the improved audio server;
    detecting either of a user confirmation signal or when a sufficient amount of the improved audio content has been downloaded or streamed to the client terminal;
    detecting a video playback timestamp parameter that indicates the current time of playback of the selected published video that is detected at the client terminal;
    setting an audio timestamp parameter that corresponds to the video timestamp parameter of the currently playing selected video content;
    muting the playback of the original audio content associated with the playback of the selected published video once the audio timestamp parameter has been set;
    once the audio timestamp parameter is set and while the original audio playback is being muted, beginning playback of the improved audio content in sync with the playback of the selected published video using the set audio timestamp parameter.

12. The method of claim 11, where the audio timestamp parameter is selected to match the video timestamp parameter as part of synchronizing the improved audio content to the selected video content.

13. A method of improving audio for a published video comprising:
    receiving, at a server side system, a URL identifying the network location to access a published video on a video access platform;
    where the URL is sent from a client device to the server side system after the user selects the published video for streaming or downloading to the client device;
    searching, in a database within the server side system, for a set of audio data representing default or selectable audio tracks that are associated with the received URL in the database;
    where the audio tracks comprise improved audio content;
    where the improved audio content is the audio content intended by the publisher of the published video as an alternative to original audio content provided with the published video;
    where the improved audio content is accessed by using at least a portion of the URL received by the improved audio server as a pointer in a database or table that resides within the improved audio server;
    providing an interface for the owner, creator, or publisher of the published video to update, replace, or append additional audio data to the set of audio data associated with the received URL;
    providing an interface to allow a client device to at least partially download or stream either a default set or a selected set of audio tracks associated with the received URL as a result of the searching;
    where the downloaded or streamed audio tracks are synchronized with a current or future playback of the selected published video.

14. The method of claim 13, further comprising:
    enabling time sensitive availability of a particular audio track as part of the set of audio data.

15. The method of claim 13, further comprising: enabling monetization of particular audio tracks among the set of audio data.

16. The method of claim 13, further comprising: playing back the default set or selected set of audio tracks downloaded or at least partially downloaded by the client device based on detecting a video playback timestamp, then setting an audio timestamp, and then muting playback of original audio content associated with the selected published video while beginning playback of the downloaded portion.

* * * * *